United States Patent
Kumar et al.

(10) Patent No.: US 11,115,108 B2
(45) Date of Patent: Sep. 7, 2021

(54) METHOD AND SYSTEM FOR FIELD AGNOSTIC SOURCE LOCALIZATION

(71) Applicant: Tata Consultancy Services Limited, Mumbai (IN)

(72) Inventors: Achanna Anil Kumar, Bangalore (IN); Girish Mariswamy Chandra, Bangalore (IN); Tapas Chakravarty, Tirupati (IN)

(73) Assignee: Tata Consultancy Services Limited, Mumbai (IN)

(*) Notice: Subject to any disclaimer, the term of this patent is extended or adjusted under 35 U.S.C. 154(b) by 0 days.

(21) Appl. No.: 17/079,220

(22) Filed: Oct. 23, 2020

(65) Prior Publication Data

US 2021/0126696 A1 Apr. 29, 2021

(30) Foreign Application Priority Data

Oct. 25, 2019 (IN) .............................. 201921043572

(51) Int. Cl.
*H04B 7/08* (2006.01)
*G06F 17/14* (2006.01)
(Continued)

(52) U.S. Cl.
CPC .......... *H04B 7/086* (2013.01); *G06F 17/141* (2013.01); *H04B 7/043* (2013.01); *H04B 7/0663* (2013.01)

(58) Field of Classification Search
None
See application file for complete search history.

(56) References Cited

U.S. PATENT DOCUMENTS 5,194,874 A * 3/1993 Perrotta .................... G01S 3/58
343/757
6,424,596 B1 * 7/2002 Donald ..................... G01S 3/86
367/124
(Continued)

FOREIGN PATENT DOCUMENTS

CN 105548957 5/2016
CN 103954931 B 6/2016
(Continued)

OTHER PUBLICATIONS

Kumar et al., Field Agnostic . . . and Source Localization, IEEE vol. 21, No. 8, Apr. 2021.*

(Continued)

*Primary Examiner* — Berhanu Tadese
(74) *Attorney, Agent, or Firm* — Finnegan, Henderson, Farabow, Garrett & Dunner, LLP

(57) ABSTRACT

This disclosure relates generally to field agnostic source localization. Conventional state-of-the-art methods perform source localization for near-field scenario by estimating carrier frequency and direction of arrival (DOA) at or above Nyquist sampling rate. Embodiments of the present disclosure provide a method for source localization at sub Nyquist sampling rate. The method estimates parameters such as range, carrier frequency and DOA of source signals from data sources in a mixed field scenario. i.e., the data sources may reside in far-field as well as near-field. The method considers a delay channel to a sensor receiver architecture for estimating the parameters. The disclosed method can be used in applications like cognitive radio to determine the carrier frequency, DOA and range of various source signals from data sources in mixed field.

11 Claims, 11 Drawing Sheets

(51) Int. Cl.
*H04B 7/0426* (2017.01)
*H04B 7/06* (2006.01)

(56) References Cited

U.S. PATENT DOCUMENTS

| | | | | |
|---|---|---|---|---|
| 7,834,795 | B1* | 11/2010 | Dudgeon | H03M 7/30 341/155 |
| 9,237,043 | B1* | 1/2016 | Beals | H04B 1/126 |
| 9,362,935 | B2* | 6/2016 | Chen | H03M 1/0854 |
| 9,374,677 | B2* | 6/2016 | Tarlazzi | G01S 5/06 |
| 9,385,781 | B2* | 7/2016 | Alloin | H04B 3/30 |
| 9,564,946 | B2* | 2/2017 | Alloin | H04B 3/30 |
| 9,762,273 | B2* | 9/2017 | Kinget | H04J 13/0029 |
| 9,924,462 | B2* | 3/2018 | Huang | H04W 52/0229 |
| 9,991,919 | B2* | 6/2018 | Le Meur | H04B 7/0848 |
| 10,122,396 | B2* | 11/2018 | Kinget | H04L 27/22 |
| 2001/0024949 | A1* | 9/2001 | Yanagida | H04M 11/04 455/404.2 |
| 2010/0277283 | A1* | 11/2010 | Burkart | G06Q 10/00 340/10.3 |
| 2010/0277285 | A1* | 11/2010 | Anderson | H04Q 9/00 340/10.4 |
| 2013/0065542 | A1* | 3/2013 | Proudkii | H03H 11/1291 455/78 |
| 2015/0119079 | A1* | 4/2015 | Tarlazzi | H04W 24/00 455/456.1 |
| 2015/0188556 | A1* | 7/2015 | Chen | H03M 1/0854 341/153 |
| 2015/0244419 | A1* | 8/2015 | Alloin | H04L 25/085 375/224 |
| 2016/0294443 | A1* | 10/2016 | Alloin | H04B 3/30 |
| 2016/0308917 | A1* | 10/2016 | Veeramani | G06F 3/0383 |
| 2018/0020404 | A1* | 1/2018 | Huang | H04W 52/0229 |
| 2018/0020405 | A1* | 1/2018 | Huang | H04W 52/0229 |
| 2019/0096416 | A1* | 3/2019 | Gorny | G10L 19/0208 |
| 2021/0126696 | A1* | 4/2021 | Kumar | G01S 3/74 |
| 2021/0156982 | A1* | 5/2021 | Stettiner | G01S 7/0235 |

FOREIGN PATENT DOCUMENTS

| | | | |
|---|---|---|---|
| CN | 108318855 | 7/2018 | |
| EP | 3435110 A1 * | 1/2019 | H04R 1/00 |

OTHER PUBLICATIONS

Liu, Sheng et al., Localization for Mixed Near-Field and Far-Field Sources by Interlaced Nested Array, Progress In Electromagnetics Research M, 2019, vol. 82, pp. 107-115, JPIER, Link: http://www.jpier.org/PIERM/pierm82/11.19042501.pdf.

Delmasa, Jean-Pierre et al., "Improved localization of near-field sources using a realistic signal propagation model and optimally-placed sensors", Digital Signal Processing, Dec. 2019, vol. 95, ScienceDirect, https://www.researchgate.net/publication/335592889_Improved_localization_of_near-field_sources_using_a_realistic_signal_propagation_model_and_optimally-placed_sensors/link/5d9b60e592851c2f70f3f380/download.

Liu, Liang et al., "A Simplified Sub-Nyquist Receiver Architecture for Joint DOA and Frequency Estimation", Mathematics, Computer Science, 2016, ArXiv, https://arxiv.org/pdf/1605.08851.pdf.

Liu, Fulai et al., "JRDF Algorithm for Joint Range-DOA—Frequency Estimation of Mixed Near-Field and Far-Field Sources", Progress In Electromagnetics Research M, 2015, vol. 43, pp. 39-50, JPIER, http://www.jpier.org/PIERM/pierm43/05.15051801.pdf.

Chen, Tao et al., "A Sub-Nyquist Sampling Digital Receiver System Based on Array Compression", Progress In Electromagnetics Research M, 2020, vol. 88, pp. 21-28, JPIER, http://www.jpier.org/PIERL/pierl88/04.19101002.pdf.

Kumar, A. Anil et al., "An efficient sub-Nyquist receiver architecture for spectrum blind reconstruction and direction of arrival estimation", International Conference on Acoustics, Speech and Signal Processing, 2014, IEEE, https://www.eurasip.org/Proceedings/Eusipco/Eusipco2015/papers/1570104003.pdf.

* cited by examiner

METHOD AND SYSTEM FOR FIELD AGNOSTIC SOURCE LOCALIZATION

PRIORITY CLAIM

This U.S patent application claims priority under 35 U.S.C. § 119 to Indian provisional application no. 201921043572, filed on Oct. 25, 2019.

TECHNICAL FIELD

The disclosure herein generally relates to the field of array signal processing, and more particularly, to a method and system for field agnostic source localization.

BACKGROUND

In many applications (for example, cognitive radio), multi-band signals (MBSs) are encountered with sparse spectrum occupancy. Most often in several applications there will be many emitting sources which are spatially distributed. Localization of these sources is very important. Also, it is observed that these sources will have different center frequencies and most importantly will not be active simultaneously and source can be placed anywhere. There are prior methods trying to solve the problem of source localization, however they consider any one field scenario, i.e., either near-field scenario or far-field scenario. Some prior methods modify receiver architecture by inserting additional delay channels. And also these prior methods assumes that the sensor signals are sampled at Nyquist rate to process the signal. Algorithms associated with these architectures are also used for carrier frequency estimation and source localization. However, many of these methods gives rise to several ambiguities and further all these methods assume far-field scenario. The existing methods had difficulty in source localization at sub-Nyquist sampling rate in a near-field scenario.

SUMMARY

Embodiments of the present disclosure present technological improvements as solutions to one or more of the above-mentioned technical problems recognized by the inventors in conventional systems. For example, in one embodiment, a method for field agnostic source localization is provided.

In an aspect, there is provided a processor implemented method for field agnostic source localization. The method comprises: receiving (i) a plurality of direct multiband spectrum (MBS) signals and (ii) a plurality of delayed MBS signals from a plurality of sensor elements in a sensor receiver array of a predefined dimension; sampling the plurality of direct MBS signals and the plurality of delayed MBS signals at one of (i) at Nyquist sampling rate (ii) above Nyquist sampling rate or (iii) below Nyquist sampling rate; obtaining (i) discrete Fourier transform (DFT) of each of the sampled direct MBS signal of the plurality of sampled direct MBS signals and (ii) discrete Fourier transform of each of the sampled delayed MBS signal of the plurality of sampled delayed MBS signals; computing a direct-direct correlation for each sensor element of the plurality of sensor elements from the DFT of each of the sampled direct MBS signal; computing a direct-delay correlation for each sensor element of the plurality of sensor elements from the DFT of each of the sampled delayed MBS signal and the DFT of each of the sampled direct MBS signal; obtaining a direct correlation data matrix using the direct-direct correlation for each sensor element of the plurality of sensor elements; obtaining a delay correlation matrix using the direct-delay correlation for each sensor element of the plurality of sensor elements; estimating a signal subspace matrix from the direct correlation data matrix; estimating a transformation matrix based on the signal subspace matrix; estimating a plurality of diagonal matrices based on the delay correlation matrix, the signal subspace matrix and the transformation matrix; jointly estimating a carrier frequency and a corresponding direction of arrival (DOA) of each source signal of a plurality of source signals from a plurality of data sources based on the plurality of diagonal matrices, the signal subspace matrix and the transformation matrix using an element-wise division of the plurality of diagonal matrices; computing a covariance matrix using one of (i) the plurality of sampled direct MBS signals or (ii) the plurality of sampled delayed MBS signals; estimating noise subspace by decomposing the covariance matrix; iteratively performing for estimating range of each source signal of the plurality of source signals, the estimating comprising: computing a maximum possible range based on the sensor receiver array dimension and the carrier frequency of the source signal; dividing the maximum possible range into a plurality of bins of predefined size; forming a steering matrix from the carrier frequency, the DOA and the plurality of bins; determining the range of the source signal as one of (i) near field or (ii) far field by projecting the steering matrix onto the noise subspace.

In another aspect, there is provided a system for field agnostic source localization. The system comprises: memory storing instructions; one or more communication interfaces; and one or more hardware processors coupled to the memory via the one or more communication interfaces, wherein the one or more hardware processors are configured by the instructions to receive (i) a plurality of direct multi-band spectrum (MBS) signals and (ii) a plurality of delayed MBS signals from a plurality of sensor elements in a sensor receiver array of a predefined dimension; sample the plurality of direct MBS signals and the plurality of delayed MBS signals at one of (i) at Nyquist sampling rate (ii) above Nyquist sampling rate or (iii) below Nyquist sampling rate; obtain (i) discrete Fourier transform (DFT) of each of the sampled direct MBS signal of the plurality of sampled direct MBS signals and (ii) discrete Fourier transform of each of the sampled delayed MBS signal of the plurality of sampled delayed MBS signals; compute a direct-direct correlation for each sensor element of the plurality of sensor elements from the DFT of each of the sampled direct MBS signal; compute a direct-delay correlation for each sensor element of the plurality of sensor elements from the DFT of each of the sampled delayed MBS signal and the DFT of each of the sampled direct MBS signal; obtain a direct correlation data matrix using the direct-direct correlation for each sensor element of the plurality of sensor elements; obtain a delay correlation matrix using the direct-delay correlation for each sensor element of the plurality of sensor elements; estimate a signal subspace matrix from the direct correlation data matrix; estimate a transformation matrix based on the signal subspace matrix; estimate a plurality of diagonal matrices based on the delay correlation matrix, the signal subspace matrix and the transformation matrix; jointly estimate a carrier frequency and a corresponding direction of arrival (DOA) of each source signal of a plurality of source signals from a plurality of data sources based on the plurality of diagonal matrices, the signal subspace matrix and the transformation matrix using an element-wise division of the plurality of diagonal matrices; compute a covariance matrix using one of (i) the plurality of sampled direct MBS signals or (ii) the plurality of sampled delayed MBS signals; estimate noise subspace by decomposing the covariance matrix; and iteratively performing for estimating range of each source signal of the plurality of source signals, the estimating comprising: compute a maximum possible range based on the sensor receiver array dimension and the carrier frequency of the source signal; divide the maximum possible range into a plurality of bins of predefined size; form a steering matrix from the carrier frequency, the DOA and the plurality of bins; and determine the range of the source signal as one of (i) near field or (ii) far field by projecting the steering matrix onto the noise subspace.

In an embodiment, the plurality of MBS signal is delayed using one of (i) a delay unit at each sensor of the plurality of sensors or (ii) delaying a clock signal at each sensor of the plurality of sensors.

In an embodiment, wherein the plurality of data sources is one or more of (i) near-field source (ii) far-field source or (iii) a combination thereof.

In an embodiment, each MBS signal represents a plurality of source signals from the plurality of data sources.

In an embodiment, the sub-Nyquist sampling rate is represented as $f_s=1/LT$, where L being sub-sampling factor and T being the period of the direct MBS signal.

In yet another aspect, there are provided one or more non-transitory machine readable information storage mediums comprising one or more instructions which when executed by one or more hardware processors causes at least one of: receiving (i) a plurality of direct multiband spectrum (MBS) signals and (ii) a plurality of delayed MBS signals from a plurality of sensor elements in a sensor receiver array of a predefined dimension; sampling the plurality of direct MBS signals and the plurality of delayed MBS signals at one of (i) at Nyquist sampling rate (ii) above Nyquist sampling rate or (iii) below Nyquist sampling rate; obtaining (i) discrete Fourier transform (DFT) of each of the sampled direct MBS signal of the plurality of sampled direct MBS signals and (ii) discrete Fourier transform of each of the sampled delayed MBS signal of the plurality of sampled delayed MBS signals; computing a direct-direct correlation for each sensor element of the plurality of sensor elements from the DFT of each of the sampled direct MBS signal; computing a direct-delay correlation for each sensor element of the plurality of sensor elements from the DFT of each of the sampled delayed MBS signal and the DFT of each of the sampled direct MBS signal; obtaining a direct correlation data matrix using the direct-direct correlation for each sensor element of the plurality of sensor elements; obtaining a delay correlation matrix using the direct-delay correlation for each sensor element of the plurality of sensor elements; estimating a signal subspace matrix from the direct correlation data matrix; estimating a transformation matrix based on the signal subspace matrix; estimating a plurality of diagonal matrices based on the delay correlation matrix, the signal subspace matrix and the transformation matrix; jointly estimating a carrier frequency and a corresponding direction of arrival (DOA) of each source signal of a plurality of source signals from a plurality of data sources based on the plurality of diagonal matrices, the signal subspace matrix and the transformation matrix using an element-wise division of the plurality of diagonal matrices; computing a covariance matrix using one of (i) the plurality of sampled direct MBS signals or (ii) the plurality of sampled delayed MBS signals; estimating noise subspace by decomposing the covariance matrix; iteratively performing for estimating range of each source signal of the plurality of source signals, the estimating comprising: computing a maximum possible range based on the sensor receiver array dimension and the carrier frequency of the source signal; dividing the maximum possible range into a plurality of bins of predefined size; forming a steering matrix from the carrier frequency, the DOA and the plurality of bins; determining the range of the source signal as one of (i) near field or (ii) far field by projecting the steering matrix onto the noise subspace.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
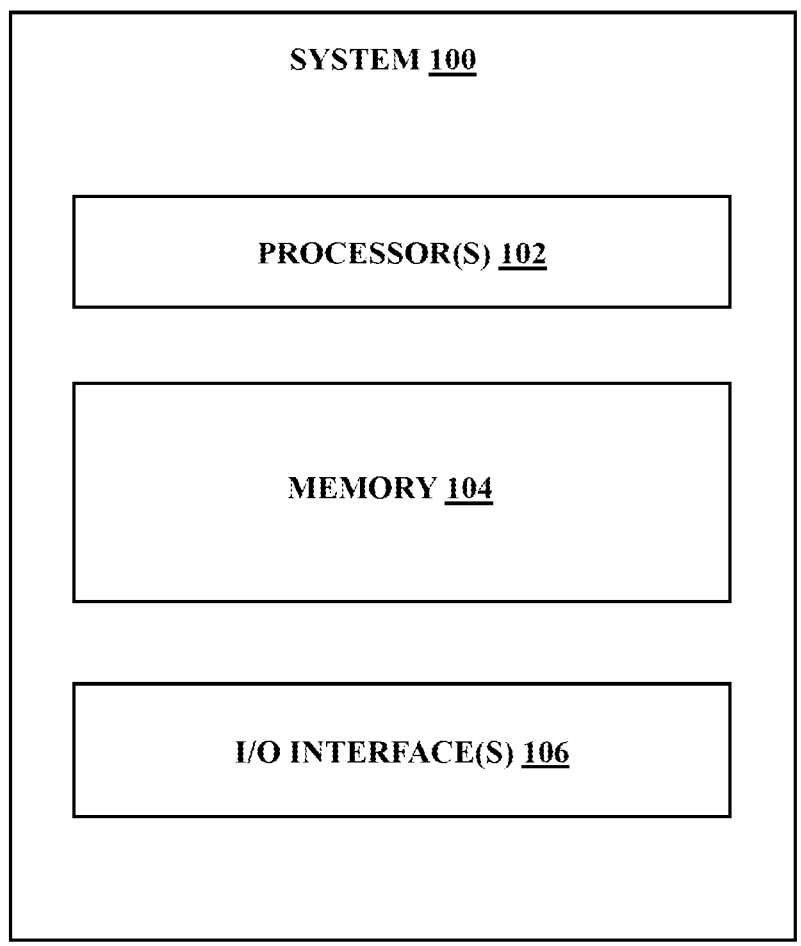
FIG. 1 illustrates an exemplary block diagram of a system for field agnostic source localization, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Multi-band signals (MBS), i.e., multiple narrow-band, disjoint, signals spread over a wide spectrum band are encountered in many applications such as cognitive radio, Frequency-Modulated Continuous-Wave (FMCW) Radar and so on. Numerous studies have indicated that the occupancy of such MBS is very low. The blindness is because in such applications, the center frequencies of these multiple narrow band signals are not prefixed and may vary with time. The Nyquist sampling rate of such blind MBS signal is very high, and given the practical limitations of analog to digital circuits (ADCs) and the processing load, it is very much essential to exploit this occupational sparsity in an intelligent way to sample and reconstruct the spectrum at sub-Nyquist sampling rates. Besides reconstruction, these applications also require localization of the sources, which is primarily achieved by employing a sensor array. Based on the carrier frequency, distance between the source and the sensor array, source localization can be categorized into near-field localization and far-field localization. Different approaches are employed for localization as the source in the far-field exhibits a planar wavefront, while in the near-field it is not planar. It is likely that since we are sensing a wide-band MBS signal, any two sources placed at a same distance but emitting at different frequencies shall exhibit different field characteristics. Hence the problem of blind MBS spectrum reconstruction and field agnostic source localization using a sensor array sampled at sub-Nyquist sampling rates is considered important.

There are prior methods for solving the problem of joint frequency and direction of arrival (DOA) estimation. The prior methods have proposed methods based on different variants of rotational invariance technique (ESPRIT) and multiple classification (MUSIC) algorithm. These methods are applicable only in case of far-field scenario. However, there are prior methods which are applicable for near-field scenario which inherently assumes Nyquist sampling rate. One of the methods proposes to decompose the entire wide MBS band into smaller bands and each band is separately examined using a two channel network. Each channel is sampled at a sub-Nyquist sampling rate. But this method requires more hardware since splitting into smaller bands have to be done in the analog domain. One of the prior methods overcomes this hardware limitation and proposes to insert just an additional delay channel at every sensor. With the aid of this additional delay channel, they proposed an algorithm for frequencies and their corresponding DOA estimation, and further also for spectrum reconstruction. Another prior method describes a method based on MWC architecture but restricted to only an L-shape sensor array. Both ESPRIT and parallel factor decomposition (PARAFAC) based algorithms were discussed to estimate the parameters jointly. However, these architectures are not suitable for a one-dimensional sensor array. Some prior methods focused on methods which are also applicable to one-dimensional uniform linear array (ULA) and outlined architectures along with corresponding algorithms for estimation of DOA and frequency. One of the prior method discussed about a delay network was inserted to one of the sensor and new ESPRIT-based algorithm which automatically provided the paired frequency and their DOA was described. On the other hand, another method modified the architecture based on the MWC architecture and they proposed MUSIC algorithm along with an additional pairing step to estimate the parameters. Although the aforementioned numerous methods exist for estimation at sub-Nyquist sampling rates, they all impose far-field restriction on the source location and further some of these approaches are limited to only a particular sensor array geometry.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an exemplary block diagram of a system 100 for field agnostic source localization, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system for performing field agnostic source localization may be stored in the memory 104.

Figure 2:
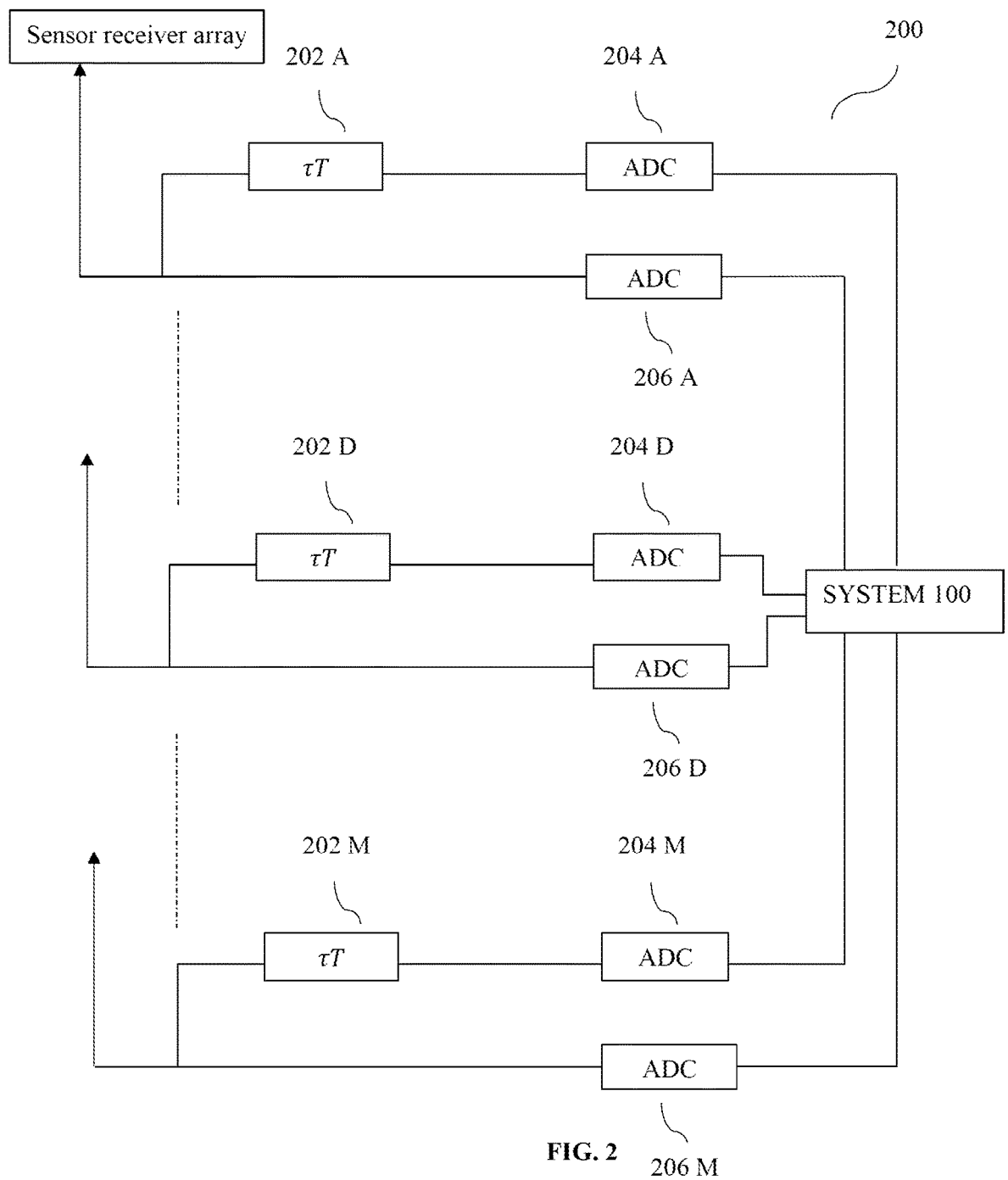
FIG. 2 illustrates a receiver architecture for field agnostic source localization, in accordance with some embodiments of the present disclosure.
Figure 3A:
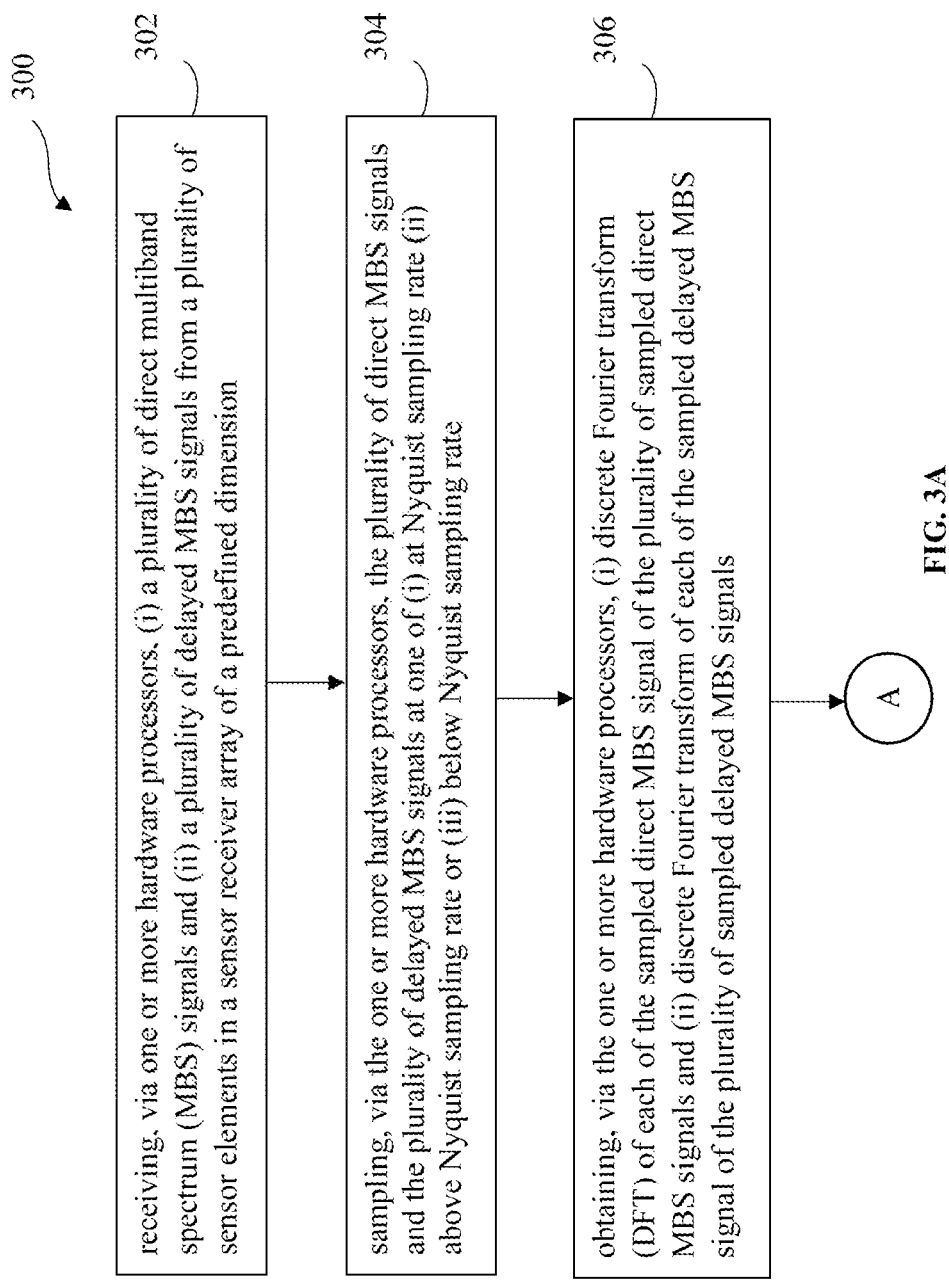
FIG. 3A through FIG. 3E is a flow diagram illustrating a method for field agnostic source localization, in accordance with some embodiments of the present disclosure.
Figure 3B:
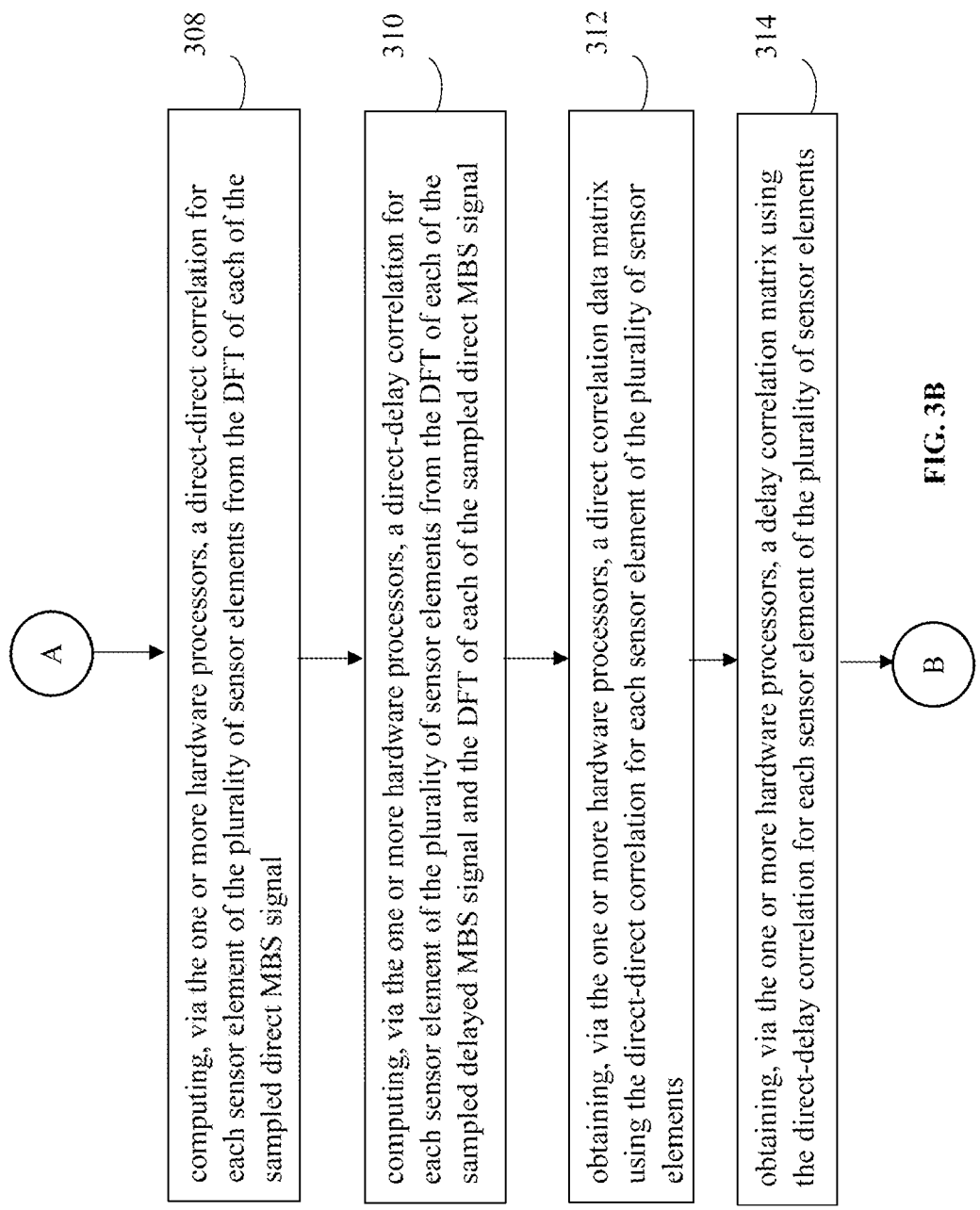
Figure 3C:
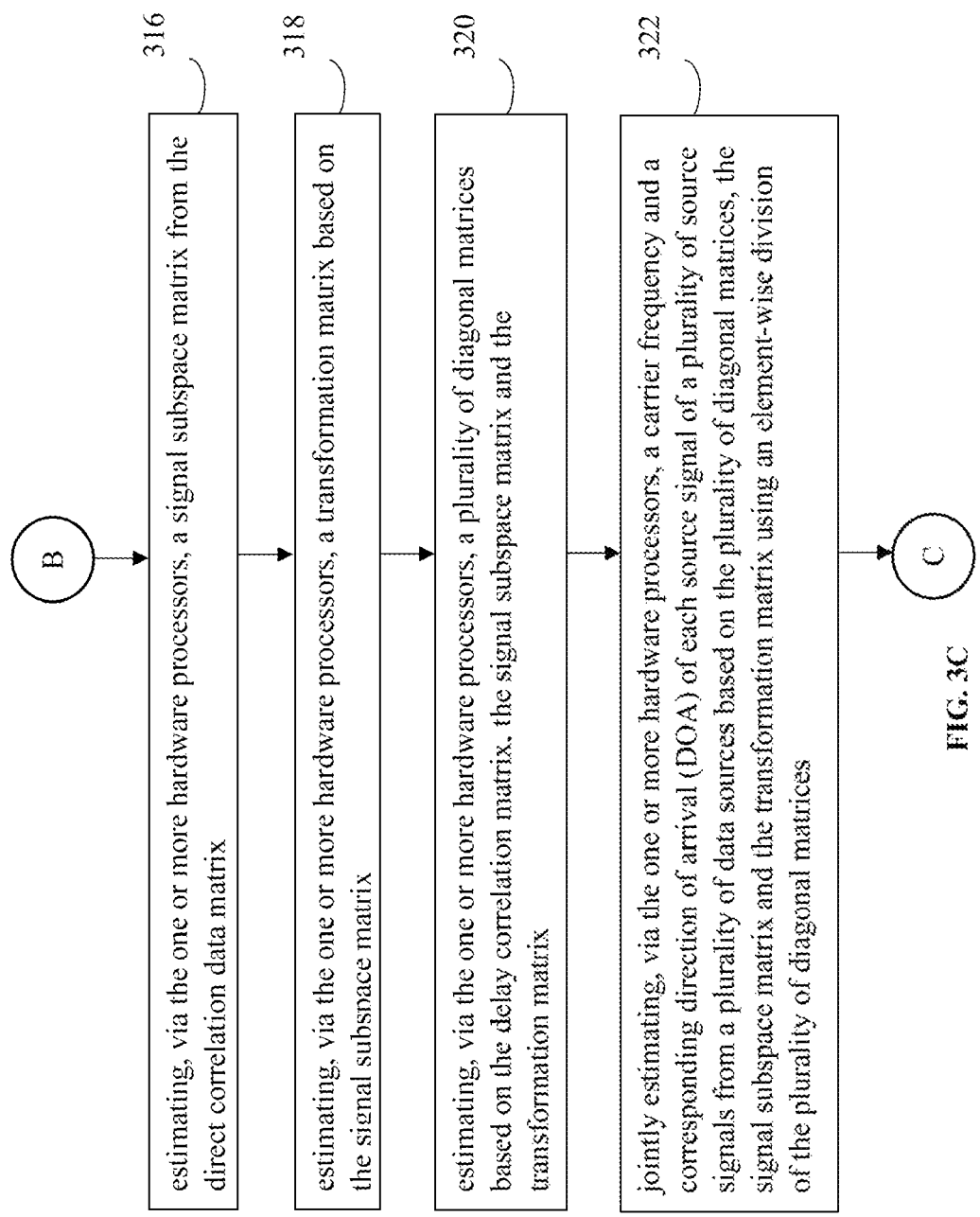
Figure 3D:
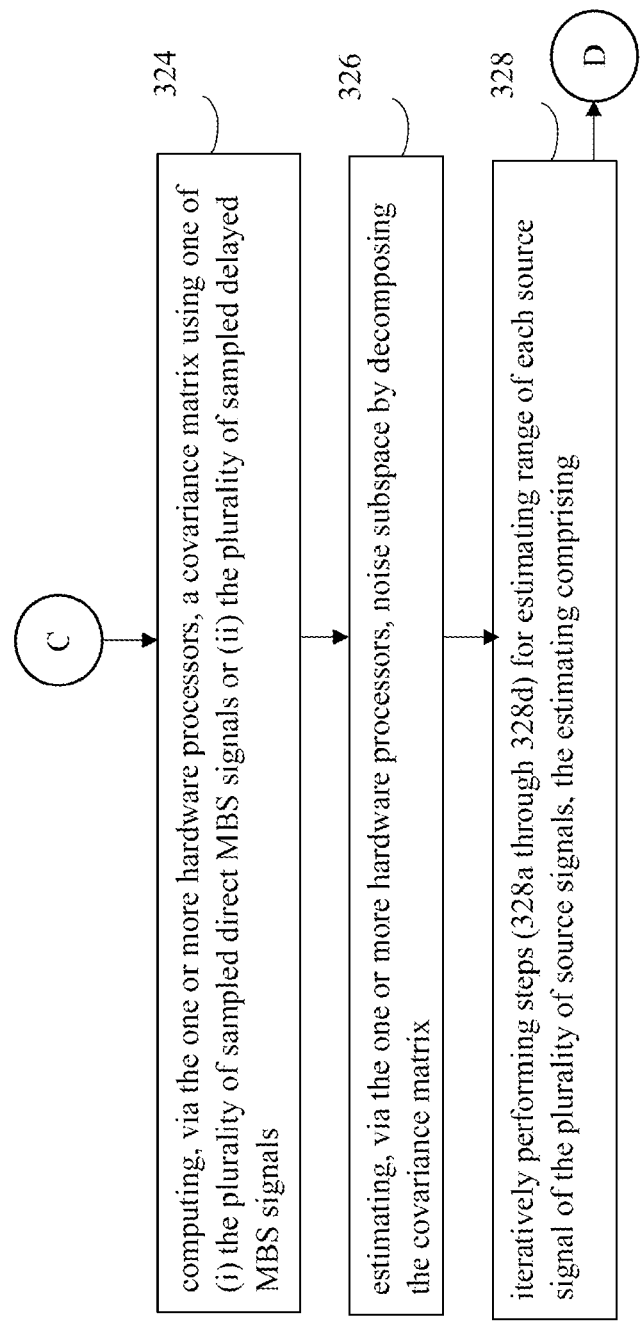
Figure 3E:
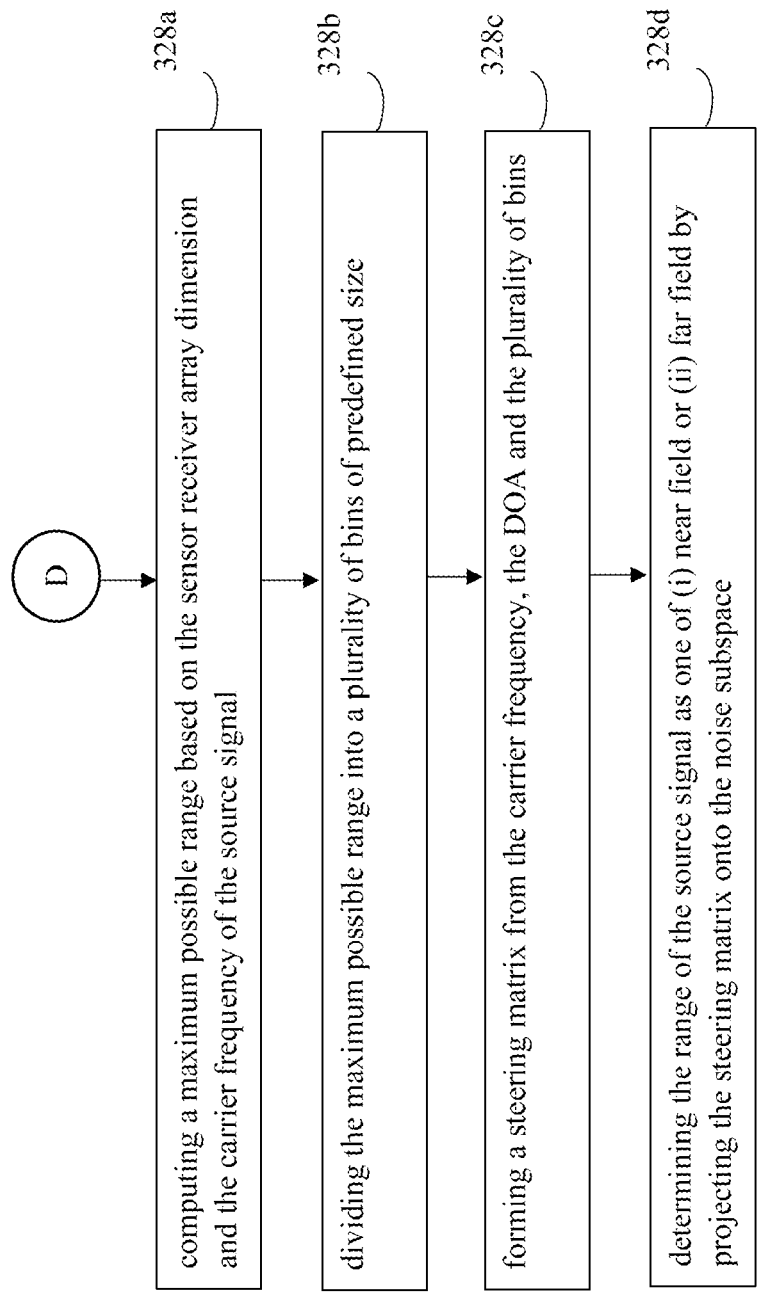

FIG. 2 illustrates a receiver architecture 200 for field agnostic source localization, in accordance with some embodiments of the present disclosure. In an embodiment, the receiver architecture 200 includes a predefined number (M) of sensors for receiving signals from one or more data sources. The architecture 200 uses a delay channel 202(A-M) at every sensor which delays the signals from the data sources. The architecture is implemented by inserting a delay unit at every sensor or by simply delaying the clock signal. The delayed signal from the delay channel and the signal from direct channel are fed into Analog to Digital Converter (ADC) 204(A-M) and 206(A-M) respectively. The output from ADC 204(A-M) and 206(A-M) are fed to the system 100 for further processing to estimate carrier frequency, DOA and range of source signals using a method 300 explained in conjunction with the FIG. 3A through FIG. 3E.

FIG. 3A through FIG. 3E is a flow diagram illustrating a method for field agnostic source localization, in accordance with some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The steps of the method 300 of the present disclosure will now be explained with reference to components of the system 100 of FIG. 1.

In an embodiment of the present disclosure, the one or more processors 102 are configured to receive at step 302 (*i*) a plurality of direct multiband spectrum (MBS) signals and (ii) a plurality of delayed MBS signals from a plurality of sensor elements in a sensor receiver array of a predefined dimension. The direct MBS signals are received from M number of sensor elements in the sensor receiver array with a predefined dimension. Let $y_m(t)$ denote the MBS signal from the $m^{th}$ sensor of the sensor receiver array. Each MBS signal from each sensor comprises source signals represented as $\{s_k(t)\}_{k=1}^{K}$ from K data sources with center frequencies represented as $\{f_k\}_{k=1}^{K}$ which are spread within a wide-band of $\mathcal{F}=[0,1/T]$. The present disclosed method is used to compute the carrier frequency $f_k$, direction of arrival (DOA) $\theta_k$ and range $r_k$ of each source signal from each data sources k. The embodiments of the present disclosure method are explained considering uniform linear array (ULA) as the sensor receiver array. However, the disclosed method can be extended for uniform centro-symmetric sensor array of d-dimension, for example ULA (d=1), uniform rectangular array (URA) (d=2) and so on. The receiver architecture 200 in FIG. 2 has an additional delay channel at every sensor in the sensor receiver array. With the aid of this delay channel the MBS signals are delayed. The received delayed MBS signals are delayed either by a delay unit at each sensor of the plurality of sensors or delaying a clock signal at each sensor of the plurality of sensors. The delay channel at every sensor delays the signal by $\tau T$, $0<\tau<1$ and T is the period of the direct MBS signal. The delayed MBS signal at $m^{th}$ sensor is represented in equation (1), $$y_m^d(t) = \sum_{k=1}^{K} s_k(t-\tau T)e^{j2\pi f_k(t-\tau T)}e^{j(m\omega_k+m^2\phi_k)} + \omega_m^d(t) \approx \qquad (1)$$
$$\sum_{k=1}^{K} s_k(t)e^{j2\pi f_k(t-\tau T)}e^{j(m\omega_k+m^2\phi_k)} + \omega_m^d(t)$$

where $\omega_m(t)$ denotes the white noise, $$\omega_k = -\frac{2\pi f_k}{c}\sin(\theta_k), \phi_k = \frac{\pi \gamma^2 f_k}{cr_k}\cos^2(\theta_k),$$

c denotes the wave propagation velocity and $\gamma$ denotes the inter-element spacing between two adjacent sensors.

In an embodiment of the present disclosure, the one or more processors 102 are configured to sample at step 304 the plurality of direct MBS signals and the plurality of delayed MBS signals at one of (i) at Nyquist sampling rate (ii) above Nyquist sampling rate or (iii) below Nyquist sampling rate. The disclosed method considers sampling at below Nyquist sampling rate (sub Nyquist sampling rate) as well as at or above Nyquist sampling rate. The sub-Nyquist sampling rate is represented as $f_s=1/LT$, where L being sub-sampling factor and T being the period of the direct MBS signal.

In an embodiment of the present disclosure, the one or more processors 102 are configured to obtain at step 306 (i) discrete Fourier transform (DFT) of each of the sampled direct MBS signal of the plurality of sampled direct MBS signals and (ii) discrete Fourier transform of each of the sampled delayed MBS signal of the plurality of sampled delayed MBS signals. The DFT of the MBS signals from delay channel and direct channel are calculated. The DFT of delayed MBS signal of equation (1) is expressed in equation (2)

$$Y_m^d(e^{j2\pi fT}) = \sum_{k=1}^{K} S_k^P(f)e^{-j2\pi f_k \tau T}e^{j(m\omega_k+m^2\phi_k)} + W_m^d(f) \qquad (2)$$

where $S_k^P(f)$ is a periodic aliased spectrum of the $k^{th}$ source signal.

In an embodiment of the present disclosure, the one or more processors 102 are configured to compute at step 308 a direct-direct correlation for each sensor element of the plurality of sensor elements from the DFT of each of the sampled direct MBS signal. The direct-direct correlation for each sensor is computed using the equation (3) as shown below, $$r_{YY}(m) = \mathbb{E}\{Y_{-m}(e^{j2\pi fT}), Y_m^*(e^{j2\pi fT})\} = \sum_{k=1}^{K}\sigma_k^2 e^{-2jm\omega_k} + \sigma_\omega^2 \delta(-2m) \qquad (3)$$

where $m \in [-\lfloor M/2 \rfloor, \lfloor M/2 \rfloor]$ and a denotes the power of $k^{th}$ source signal.

In an embodiment of the present disclosure, the one or more processors 102 are configured to compute at step 310 a direct-delay correlation for each sensor element of the plurality of sensor elements from the DFT of each of the sampled delayed MBS signal and the DFT of each of the sampled direct MBS signal. The direct-delay correlation for each sensor is computed from the DFT of the delayed MBS signal. The direct-delay correlation computation is shown in equation (4) shown below, $$r_{YY}^d(m) = \qquad (4)$$
$$\mathbb{E}\{Y_{-m}(e^{j2\pi fT}), Y_m^{d*}(e^{j2\pi fT})\} = \sum_{k=1}^{K}\sigma_k^2 e^{j2\pi f_k \tau T}e^{-2jm\omega_k} + \sigma_\omega^2 \delta(-2m)$$

In an embodiment of the present disclosure, the one or more processors 102 are configured to obtain at step 312 a direct correlation data matrix using the direct-direct correlation for each sensor element of the plurality of sensor elements. The direct correlation matrix is obtained from the direct-direct correlation for each sensor element and is shown as in equation (5) below, $$D_{r_{YY}} = \begin{pmatrix} r_{YY}(0) & r_{YY}(1) & \cdots & r_{YY}\left(\left\lfloor\frac{M}{2}\right\rfloor\right) \\ r_{YY}(-1) & r_{YY}(0) & & r_{YY}\left(\left\lfloor\frac{M}{2}\right\rfloor-1\right) \\ \vdots & & \ddots & \vdots \\ r_{YY}\left(-\left\lfloor\frac{M}{2}\right\rfloor\right) & r_{YY}\left(-\left\lfloor\frac{M}{2}\right\rfloor+1\right) & \cdots & r_{YY}(0) \end{pmatrix} \qquad (5)$$

On similar lines, in an embodiment of the present disclosure, the one or more processors 102 are configured to obtain at step 314 a delay correlation matrix $D_{r_{YY}}^d$ using the direct-delay correlation for each sensor element of the plurality of sensor elements.

The matrices $D_{r_{YY}}$ and $D_{r_{YY}}^d$ can be decomposed as in equation (6) and equation (7), $$D_{r_{YY}} = A(\omega)\Sigma_\sigma A^H(\omega) + \delta_\omega^2 I \qquad (6)$$

$$D_{r_{YY}}^d = A(\omega)\Sigma_\sigma \Lambda_f A^H(\omega) + \delta_\omega^2 I \qquad (7)$$

where $A(\omega)=[a(\omega_1), a(\omega_2), \ldots a(\omega_K)]$ and for any $k \in [1,K]$, $$a(\omega_k) = \left[1, e^{2j\omega_k}, \ldots, e^{2\left\lfloor\frac{M}{2}\right\rfloor j\omega_k}\right]^T.$$

$\Sigma_\sigma$ and $\Lambda_f$ are diagonal matrices with diagonal elements $\{\sigma_1^2, \sigma_2^2, \ldots, \sigma_K^2\}$ and $\{e^{j2\pi f_1 \tau T}, e^{j2\pi f_2 \tau T}, \ldots, e^{j2\pi f_K \tau T}\}$ respectively. Since $A(\omega)$ is a Vandermonde matrix, using this structure the following relationship is expressed as equation (8), $$\overline{A(\omega)} = \underline{A(\omega)} \Lambda_\omega \quad (8)$$

where $\overline{(.)}$ and $\underline{(.)}$ represents matrices with first and last row removed respectively, and $\Lambda_\omega$ is a diagonal matrix with diagonal elements $\{e^{2jw_1}, e^{2jw_2}, \ldots, e^{2jw_K}\}$.

In an embodiment of the present disclosure, the one or more processors 102 are configured to estimate at step 316 a signal subspace matrix from the direct correlation data matrix. Signal subspace matrix is estimated from direct correlation matrix. $D_{r_{YY}}$ is a positive semi-definite Hermitian matrix, the Singular Value Decomposition (SVD) of $D_{r_{YY}}$ yields $$D_{r_{YY}} = (U_s \ U_n) \begin{pmatrix} \Sigma_s & 0 \\ 0 & \Sigma_n \end{pmatrix} (U_s \ U_n)^H \quad (9)$$

where $U_s$ and $U_n$ are of dimensions $(\lfloor M/2 \rfloor + 1) \times K$ and $(\lfloor M/2 \rfloor + 1) \times (\lfloor M/2 \rfloor + 1) - K$ and referred as signal subspace and noise subspace respectively. $U_s$ and $U_n$ span orthogonal subspaces.

In an embodiment of the present disclosure, the one or more processors 102 are configured to estimate at step 318 a transformation matrix based on the signal subspace matrix. The transformation matrix is estimated using the signal subspace matrix. The eigen-values and eigenvectors of the matrix $(\underline{U_s})^\dagger \overline{U_s}$ provide the diagonal matrix $\Lambda_w$ and the transformation matrix $T_R$ respectively, where $(.)^\dagger$ denotes the pseudo-inverse.

$$\psi^{(d)} = \Sigma_{k=1}^K \psi^{M_k} = T_R(\Sigma_{k=1}^K \Omega^{k,(d)}) T_R^{-1} \quad (10)$$

The equation (10) shows that the eigen-vectors of $\psi^{(d)}$ are the transformation matrices $T_R$.

In an embodiment of the present disclosure, the one or more processors 102 are configured to estimate at step 320 a plurality of diagonal matrices based on the delay correlation matrix, the signal subspace matrix and the transformation matrix. The diagonal matrices $\Sigma_\sigma$ and $\Sigma_{\Lambda_f}$ are estimated from the delay correlation matrix, the signal subspace matrix and the transformation matrix. The equations for estimation the diagonal matrices are shown as equation (11) and equation (12) below, $$\Sigma_\sigma = (U_S T_R)^\dagger D_{r_{YY}} ((U_S T_R)^H)^\dagger \quad (11)$$

$$\Sigma_{\Lambda_f} = (U_S T_R)^\dagger D_{r_{YY}^d} ((U_S T_R)^H)^\dagger \quad (12)$$

In an embodiment of the present disclosure, the one or more processors 102 are configured to jointly estimate at step 322 a carrier frequency and a corresponding direction of arrival (DOA) of each source signal of a plurality of source signals from a plurality of data sources based on the plurality of diagonal matrices, the signal subspace matrix and the transformation matrix using an element-wise division of the plurality of diagonal matrices. Using the diagonal matrices, $\Lambda_f = \Sigma_{\Lambda_f} \oslash \Sigma_\sigma$ is estimated, where $\oslash$ denotes element-wise division. Further using $\Lambda_f$ and $\Lambda_w$ (as in equation (8)) the carrier frequency and the corresponding DOA of the source signal is estimated.

In an embodiment of the present disclosure, the one or more processors 102 are configured to compute at step 324 a covariance matrix using one of (i) the plurality of sampled direct MBS signals or (ii) the plurality of sampled delayed MBS signals. The covariance matrix is computed using the equation (13) below, $$R_{COV} = \mathbb{E}\{Y^d(e^{j2\pi fT}), Y^{dH}(e^{j2\pi fT})\} \quad (13)$$

where $Y^d(e^{j2\pi fT}) = [Y_{-m}^d(e^{j2\pi fT}), Y_{-m+1}^d(e^{j2\pi fT}), \ldots, Y_m^d(e^{j2\pi fT})]$.

In an embodiment of the present disclosure, the one or more processors 102 are configured to estimate at step 326 noise subspace by decomposing the covariance matrix. The noise subspace is estimated from the covariance matrix by performing Singular Value Decomposition (SVD).

In an embodiment of the present disclosure, the one or more processors 102 are configured to iteratively perform steps (328a through 328d) for estimating range of each source signal of the plurality of source signals. In an embodiment, the estimation of range is performed by computing at step 328a a maximum possible range based on the sensor receiver array dimension and the carrier frequency of the source signal. And at step 328b the maximum possible range is divided into a plurality of bins of predefined size. The maximum possible range is discretized into L values. Further at step 328c a steering matrix is formed from the carrier frequency, the DOA and the plurality of bins. Let $a^{nf}(r_k, f_k, \theta_k)$ and $a^{ff}(r_k, f_k, \theta_k)$ denote the steering vector of any k source in near-field and far-field respectively with $m^{th}$ row given as $[a^{nf}(r_k, f_k, \theta_k)]_m = e^{\tau(m,k)^{nf}}$ and $[a^{ff}(r_k, f_k, \theta_k)]_m = e^{\tau(m,k)^{ff}}$. And determines the range of the source signal at step 328d as one of (i) near field or (ii) far field by projecting the steering matrix into the noise subspace. For every estimated pair $(f_k, \theta_k)$, for all $1 \leq k \leq K$ the range is determined by projecting all possible range values, i.e., the steering matrix into the noise subspace. The range is determined either as near field or far field as shown below in equations (14) and (15):

$$p_{mu}^{nf}(r_l, f_k, \theta_k) = \frac{1}{a^{nfH}(r_l, f_k, \theta_k) V_n V_n^H a^{(nf)}(r_l, f_k, \theta_k)} \quad (14)$$

for all $l = 1, 2, \ldots, L$ $$p_{mu}^{ff}(f_k, \theta_k) = \frac{1}{a^{ffH}(f_k, \theta_k) V_n V_n^H a^{(ff)}(f_k, \theta_k)} \quad (15)$$

Concatenate the equation (10) and (11) to form $P_{mu}(k) = [P_{mu}^{nf}(r_1, f_k, \theta_k), \ldots, P_{mu}^{nf}(r_L, f_k, \theta_k), P_{mu}^{ff}(f_k, \theta_k)]$. The peak of $P_{mu}(k)$ indicates whether the source is in near-field or far-field and also provides the corresponding range in case if the source is in near-field.

Experimental Results:

The simulation results were used to assess the performance of the present disclosed method and also to demonstrate the capabilities of the disclosed method. In the simulation $\mathcal{F} = [0, 100 \text{ MHz}]$ and the narrow information band B=2 MHz are fixed. Two near-field and one far-field source configuration are considered. Near-field sources: Source 1—(46.25 MHz, 20 deg, 10 m), Source 2—(36.25 MHz, 10 deg, 10 m) and far-field source, Source 3—(26.25 MHz, −60 deg). The down sampling factor L=10 is chosen i.e., each ADC samples at a rate of $$f_s = \frac{f_{nq}}{L} = 10 \text{ MHz},$$

Figure 4A:
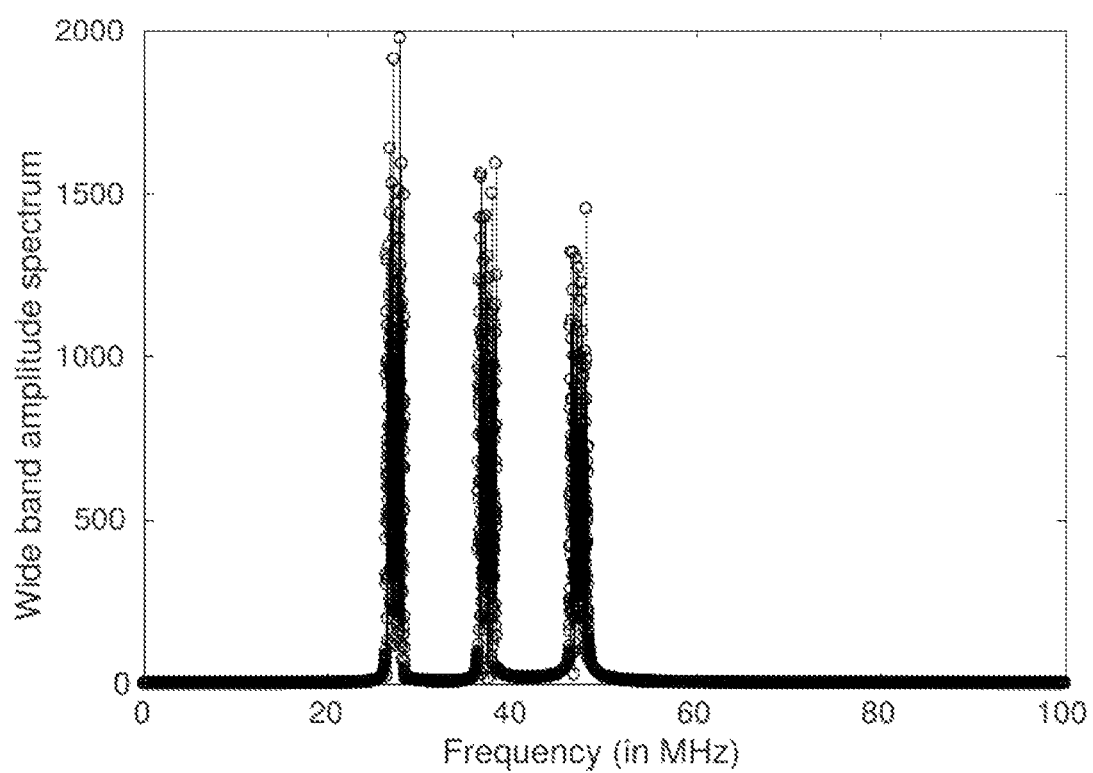
FIG. 4A and FIG. 4B illustrates amplitude spectrum of original and reconstructed and down sampled multiband spectrum signal according to some embodiments of the present disclosure.
Figure 4B:
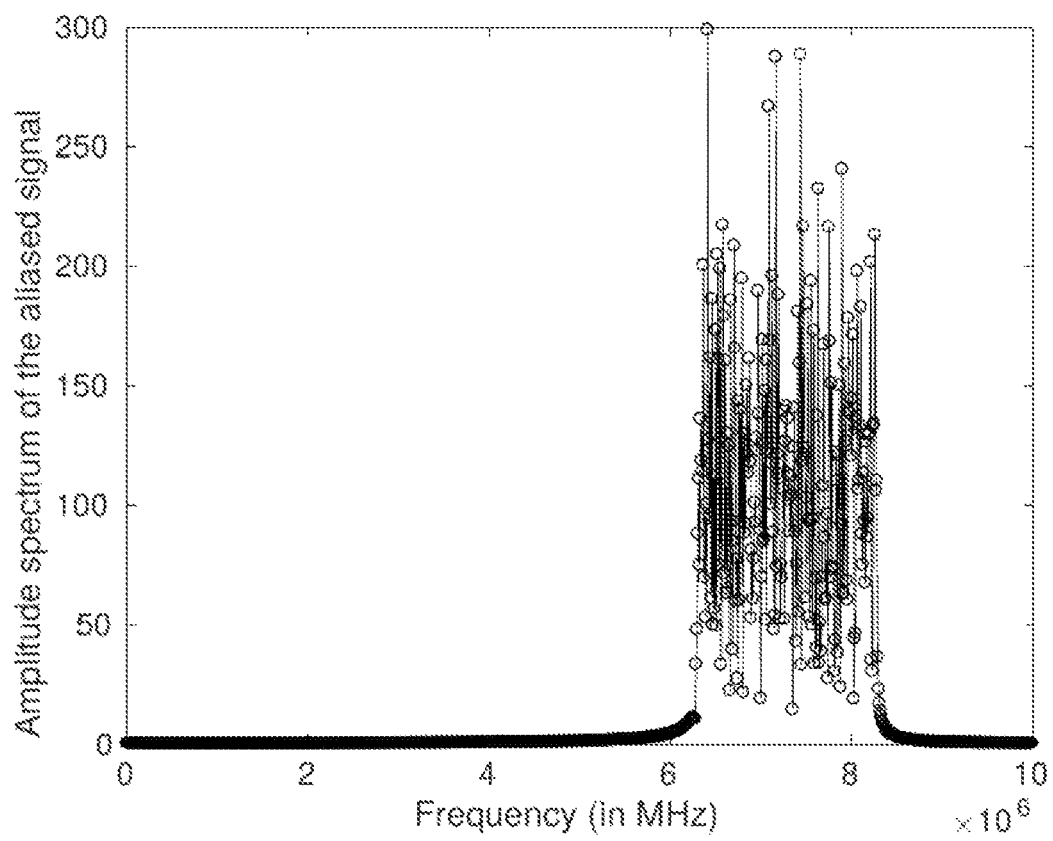

Nyquist sampling rate $f_{nq}$=100 MHz and fixed the delay factor of the delay channel $\tau$=0.5. FIG. 4A and FIG. 4B illustrates amplitude spectrum of original and reconstructed and down sampled multiband spectrum signal according to some embodiments of the present disclosure. FIG. 4A illustrates amplitude spectrum of original and reconstructed multiband spectrum signal and FIG. 4B illustrates down sampled multiband spectrum signal. Here, ULA with M=11 and inter-element distance of $$\gamma = \frac{\lambda_{nyq}}{4} = 0.75\text{m}.$$

Figure 5:
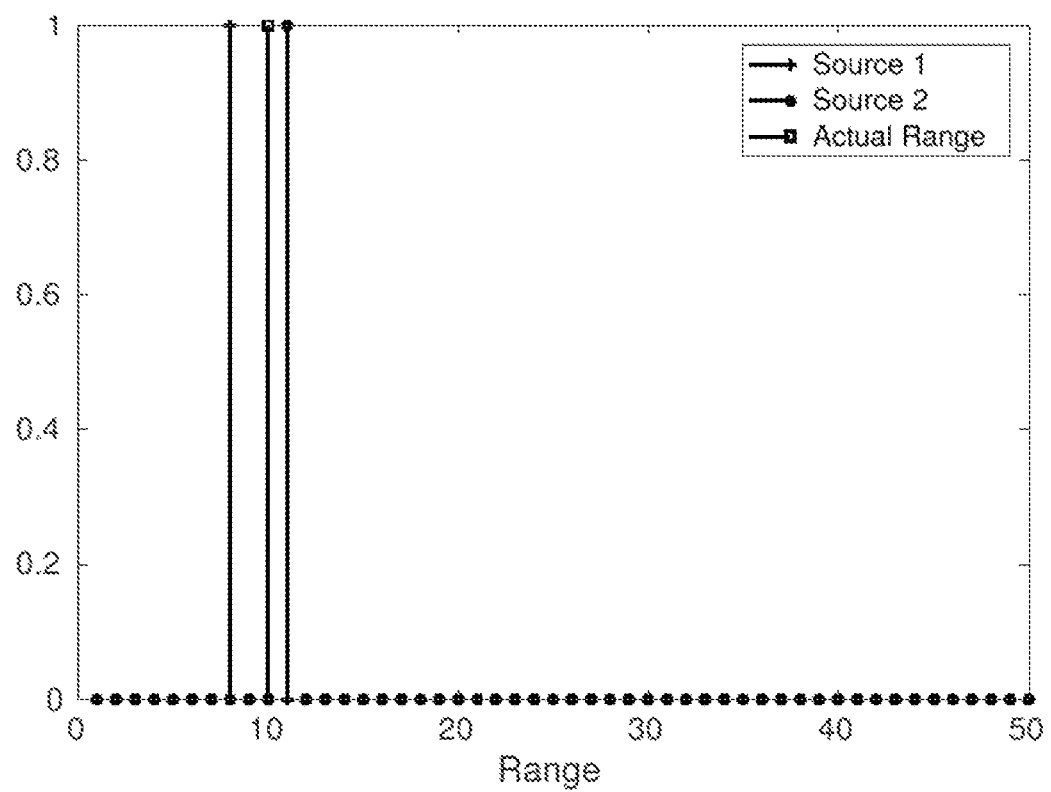
FIG. 5 illustrates actual and estimated range of two near field sources in accordance with some embodiments of the present disclosure.
Figure 6:
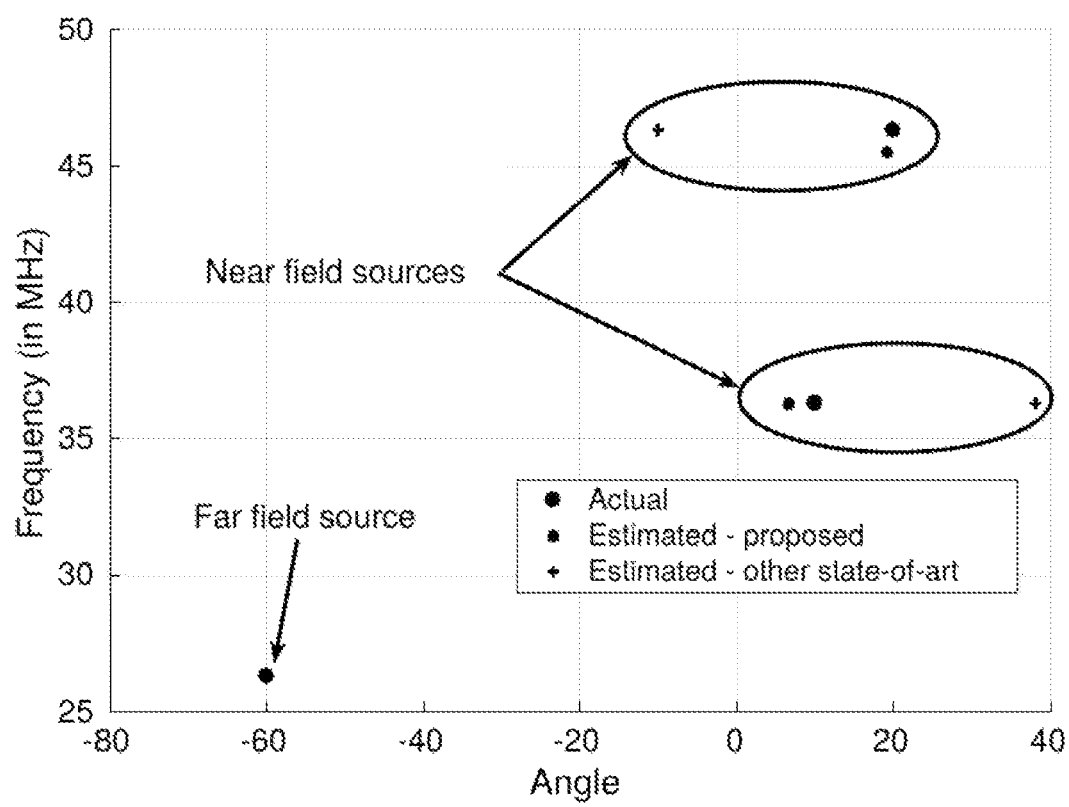
FIG. 6 illustrates a scatter plot of actual and estimated carrier frequency and corresponding direction of arrival in accordance with some embodiments of the present disclosure.

FIG. 5 illustrates actual and estimated range of two near field sources in accordance with some embodiments of the present disclosure. Source 1 has a higher frequency than Source 2 and hence Source 2 has a slightly lesser deviation than Source 1. An experiment was performed to study the effect of using far-field prior method algorithm on this mixed field scenario. Since ULA is not suitable for the prior method algorithm, a 5×3 URA was chosen and source configuration was unchanged. FIG. 6 illustrates a scatter plot of actual and estimated carrier frequency and corresponding direction of arrival in accordance with some embodiments of the present disclosure. From the figure it is noticed that for the far-field source, the estimated value and the actual value is very close compared to the near-field sources. The figure shows a comparison with a prior method algorithm and also with the actual value. The deviation in the estimated values for the near-field sources is due to the Fresnel approximation. It can be noticed that carrier frequency estimation is unaffected when the prior method algorithm is applied in this mixed-field scenario. While for the far-field source, the prior method algorithm was able to estimate the DOA properly, but for the near-field sources the estimation completely fails and a huge deviation from the actual value can be observed. The figure also shows the significant improvement one can obtain when the disclosed method is employed. The results clearly demonstrate that the disclosed method, apart from its applicability over more generic Uniform Centro-Symmetric array has the unique advantage of being field-agnostic compared to other state-of-the-art approaches. Thus, one can consider the disclosed method as a truly blind sub-Nyquist source localization and reconstruction scheme.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses the problem of field agnostic source localization at sub Nyquist sampling rates using a sensor receiver array. The sensor receiver array used is a uniform linear array, however for the present disclosed method a uniform centro-symmetric array can also be considered. The disclosed method considers a mixed field scenario, i.e. at near-field and far-field. The disclosed method provides a method for estimating parameters such as carrier frequency, DOA and range of source signals from data sources by considering the delay channel to the receiver architecture. The disclosed method can directly be extended to far field scenario to provide field agnostic source localization.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving, via one or more hardware processors, (i) a plurality of direct multiband spectrum (MBS) signals and (ii) a plurality of delayed MBS signals from a plurality of sensor elements in a sensor receiver array of a predefined dimension;
sampling, via the one or more hardware processors, the plurality of direct MBS signals and the plurality of delayed MBS signals at one of (i) at Nyquist sampling rate (ii) above Nyquist sampling rate or (iii) below Nyquist sampling rate;
obtaining, via the one or more hardware processors, (i) discrete Fourier transform (DFT) of each of the sampled direct MBS signal of the plurality of sampled direct MBS signals and (ii) discrete Fourier transform of each of the sampled delayed MBS signal of the plurality of sampled delayed MBS signals;
computing, via the one or more hardware processors, a direct-direct correlation for each sensor element of the plurality of sensor elements from the DFT of each of the sampled direct MBS signal;
computing, via the one or more hardware processors, a direct-delay correlation for each sensor element of the plurality of sensor elements from the DFT of each of the sampled delayed MBS signal and the DFT of each of the sampled direct MBS signal;
obtaining, via the one or more hardware processors, a direct correlation data matrix using the direct-direct correlation for each sensor element of the plurality of sensor elements;
obtaining, via the one or more hardware processors, a delay correlation matrix using the direct-delay correlation for each sensor element of the plurality of sensor elements;
estimating, via the one or more hardware processors, a signal subspace matrix from the direct correlation data matrix;
estimating, via the one or more hardware processors, a transformation matrix based on the signal subspace matrix;
estimating, via the one or more hardware processors, a plurality of diagonal matrices based on the delay correlation matrix, the signal subspace matrix and the transformation matrix;
jointly estimating, via the one or more hardware processors, a carrier frequency and a corresponding direction of arrival (DOA) of each source signal of a plurality of source signals from a plurality of data sources based on the plurality of diagonal matrices, the signal subspace matrix and the transformation matrix using an element-wise division of the plurality of diagonal matrices;
computing, via the one or more hardware processors, a covariance matrix using one of (i) the plurality of sampled direct MBS signals or (ii) the plurality of sampled delayed MBS signals;
estimating, via the one or more hardware processors, noise subspace by decomposing the covariance matrix; and
iteratively performing a set of steps for estimating range of each source signal of the plurality of source signals, the estimating comprising:

computing a maximum possible range based on the sensor receiver array dimension and the carrier frequency of the source signal;
dividing the maximum possible range into a plurality of bins of predefined size;
forming a steering matrix from the carrier frequency, the DOA and the plurality of bins; and
determining the range of the source signal as one of (i) near field or (ii) far field by projecting the steering matrix onto the noise subspace.

2. The processor implemented method claimed as in claim 1, wherein the plurality of MBS signal is delayed using one of (i) a delay unit at each sensor of the plurality of sensors or (ii) delaying a clock signal at each sensor of the plurality of sensors.

3. The processor implemented method claimed as in claim 1, wherein the plurality of data sources is one or more of (i) near-field source (ii) far-field source or (iii) a combination thereof.

4. The processor implemented method claimed as in claim 1, wherein each MBS signal represents a plurality of source signals from the plurality of data sources.

5. The processor implemented method claimed as in claim 1, wherein the sub-Nyquist sampling rate is represented as $f_s=1/LT$, where L being sub-sampling factor and T being the period of the direct MBS signal.

6. A system, comprising:
a memory storing instructions;
one or more communication interfaces; and
one or more hardware processors coupled to the memory via the one or more communication interfaces, wherein the one or more hardware processors are configured by the instructions to:
receive (i) a plurality of direct multiband spectrum (MBS) signals and (ii) a plurality of delayed MBS signals from a plurality of sensor elements in a sensor receiver array of a predefined dimension;
sample the plurality of direct MBS signals and the plurality of delayed MBS signals at one of (i) at Nyquist sampling rate (ii) above Nyquist sampling rate or (iii) below Nyquist sampling rate;
obtain (i) discrete Fourier transform (DFT) of each of the sampled direct MBS signal of the plurality of sampled direct MBS signals and (ii) discrete Fourier transform of each of the sampled delayed MBS signal of the plurality of sampled delayed MBS signals;
compute a direct-direct correlation for each sensor element of the plurality of sensor elements from the DFT of each of the sampled direct MBS signal;
compute a direct-delay correlation for each sensor element of the plurality of sensor elements from the DFT of each of the sampled delayed MBS signal and the DFT of each of the sampled direct MBS signal;
obtain a direct correlation data matrix using the direct-direct correlation for each sensor element of the plurality of sensor elements;
obtain a delay correlation matrix using the direct-delay correlation for each sensor element of the plurality of sensor elements;
estimate a signal subspace matrix from the direct correlation data matrix;
estimate a transformation matrix based on the signal subspace matrix;
estimate a plurality of diagonal matrices based on the delay correlation matrix, the signal subspace matrix and the transformation matrix;

jointly estimate a carrier frequency and a corresponding direction of arrival (DOA) of each source signal of a plurality of source signals from a plurality of data sources based on the plurality of diagonal matrices, the signal subspace matrix and the transformation matrix using an element-wise division of the plurality of diagonal matrices;

compute a covariance matrix using one of (i) the plurality of sampled direct MBS signals or (ii) the plurality of sampled delayed MBS signals;

estimate noise subspace by decomposing the covariance matrix; and iteratively performing for estimating range of each source signal of the plurality of source signals, the estimating comprising:
 compute a maximum possible range based on the sensor receiver array dimension and the carrier frequency of the source signal;
 divide the maximum possible range into a plurality of bins of predefined size;
 form a steering matrix from the carrier frequency, the DOA and the plurality of bins; and
 determine the range of the source signal as one of (i) near field or (ii) far field by projecting the steering matrix onto the noise subspace.

7. The system of claim 6, wherein the plurality of MBS signal is delayed using one of (i) a delay unit at each sensor of the plurality of sensors or (ii) delaying a clock signal at each sensor of the plurality of sensors.

8. The system of claim 6, wherein the plurality of data sources is one or more of (i) near-field source (ii) far-field source or (iii) a combination thereof.

9. The system of claim 6, wherein each MBS signal represents a plurality of source signals from the plurality of data sources.

10. The system of claim 6, wherein the sub-Nyquist sampling rate is represented as $f_s=1/LT$, where L being sub-sampling factor and T being the period of the direct MBS signal.

11. One or more non-transitory machine readable information storage mediums comprising one or more instructions, which when executed by one or more hardware processors causes a method for:

receiving (i) a plurality of direct multiband spectrum (MBS) signals and (ii) a plurality of delayed MBS signals from a plurality of sensor elements in a sensor receiver array of a predefined dimension;

sampling the plurality of direct MBS signals and the plurality of delayed MBS signals at one of (i) at Nyquist sampling rate (ii) above Nyquist sampling rate or (iii) below Nyquist sampling rate;

obtaining (i) discrete Fourier transform (DFT) of each of the sampled direct MBS signal of the plurality of sampled direct MBS signals and (ii) discrete Fourier transform of each of the sampled delayed MBS signal of the plurality of sampled delayed MBS signals;

computing a direct-direct correlation for each sensor element of the plurality of sensor elements from the DFT of each of the sampled direct MBS signal;

computing a direct-delay correlation for each sensor element of the plurality of sensor elements from the DFT of each of the sampled delayed MBS signal and the DFT of each of the sampled direct MBS signal;

obtaining a direct correlation data matrix using the direct-direct correlation for each sensor element of the plurality of sensor elements;

obtaining a delay correlation matrix using the direct-delay correlation for each sensor element of the plurality of sensor elements;

estimating a signal subspace matrix from the direct correlation data matrix;

estimating a transformation matrix based on the signal subspace matrix;

estimating a plurality of diagonal matrices based on the delay correlation matrix, the signal subspace matrix and the transformation matrix;

jointly estimating a carrier frequency and a corresponding direction of arrival (DOA) of each source signal of a plurality of source signals from a plurality of data sources based on the plurality of diagonal matrices, the signal subspace matrix and the transformation matrix using an element-wise division of the plurality of diagonal matrices;

computing a covariance matrix using one of (i) the plurality of sampled direct MBS signals or (ii) the plurality of sampled delayed MBS signals;

estimating noise subspace by decomposing the covariance matrix; and iteratively performing for estimating range of each source signal of the plurality of source signals, the estimating comprising:
 computing a maximum possible range based on the sensor receiver array dimension and the carrier frequency of the source signal;
 dividing the maximum possible range into a plurality of bins of predefined size;
 forming a steering matrix from the carrier frequency, the DOA and the plurality of bins; and
 determining the range of the source signal as one of (i) near field or (ii) far field by projecting the steering matrix onto the noise subspace.

* * * * *